(12) United States Patent
Machida et al.

(10) Patent No.: US 8,413,635 B2
(45) Date of Patent: Apr. 9, 2013

(54) VEHICLE CONTROL DEVICE AND IDLING SYSTEM

(75) Inventors: Kenichi Machida, Isesaki (JP); Eiichi Otsu, Mito (JP); Minoru Ohsuga, Hitachinaka (JP); Shigenori Nakazato, Mito (JP); Yoshiaki Nagasawa, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 489 days.

(21) Appl. No.: 12/709,237

(22) Filed: Feb. 19, 2010

(65) Prior Publication Data

US 2010/0242905 A1 Sep. 30, 2010

(30) Foreign Application Priority Data

Mar. 27, 2009 (JP) ................................. 2009-078010

(51) Int. Cl.
*F02D 41/00* (2006.01)
*F02N 11/08* (2006.01)

(52) U.S. Cl.
USPC .................................. 123/339.14; 123/179.3

(58) Field of Classification Search .............. 123/179.1, 123/179.3, 179.12, 179.14, 179.28, 185.14, 123/198 D, 198 DB, 198 F, 339.14, 339.15; 701/112, 113
See application file for complete search history.

(56) References Cited

U.S. PATENT DOCUMENTS

| | | | | |
|---|---|---|---|---|
| 7,506,625 B2 * | 3/2009 | Leman et al. | ............... | 123/179.3 |
| 7,681,545 B2 * | 3/2010 | Taki et al. | .................. | 123/179.3 |
| 8,047,188 B2 * | 11/2011 | Gibson et al. | ................. | 123/636 |
| 2004/0221828 A1 | 11/2004 | Ries-Mueller et al. | | |
| 2005/0280262 A1 * | 12/2005 | Kim | ............................. | 290/38 R |
| 2006/0021808 A1 * | 2/2006 | McGee et al. | ............... | 180/65.2 |
| 2008/0127927 A1 * | 6/2008 | Hirning et al. | ............. | 123/179.3 |
| 2009/0020091 A1 * | 1/2009 | Botzenhard et al. | ........ | 123/179.3 |
| 2010/0282199 A1 * | 11/2010 | Heyers et al. | ............... | 123/179.3 |

FOREIGN PATENT DOCUMENTS

| | | |
|---|---|---|
| DE | 10 2006 011 644 A1 | 9/2007 |
| DE | 10 2007 032 316 A1 | 1/2009 |
| JP | 2000-291517 A | 10/2000 |
| JP | 4211208 B2 | 3/2002 |
| JP | 4214401 B2 | 12/2005 |
| WO | WO 2009/083477 A1 | 7/2009 |
| WO | WO 2010/012530 A1 | 2/2010 |

OTHER PUBLICATIONS

European Search Report dated Nov. 12, 2010 (Seven (7) pages).

\* cited by examiner

*Primary Examiner* — John T. Kwon
*Assistant Examiner* — Johnny Hoang
(74) *Attorney, Agent, or Firm* — Crowell & Moring LLP

(57) ABSTRACT

A vehicle control device, including a vehicle control unit that controls engagement between an engine and a starter motor for starting the engine, wherein the vehicle control unit, along with cutting off fuel supply to the engine and causing the engine to rotate inertially, also, in a state in which fuel supply to the engine is cut off and the starter motor is not engaged with the engine, rotates the starter motor, and thereafter controls supply of electrical power to the starter motor so as to causes the starter motor to rotate inertially, and engages the starter motor to the engine while both the engine and the starter motor are performing inertial rotation.

21 Claims, 11 Drawing Sheets

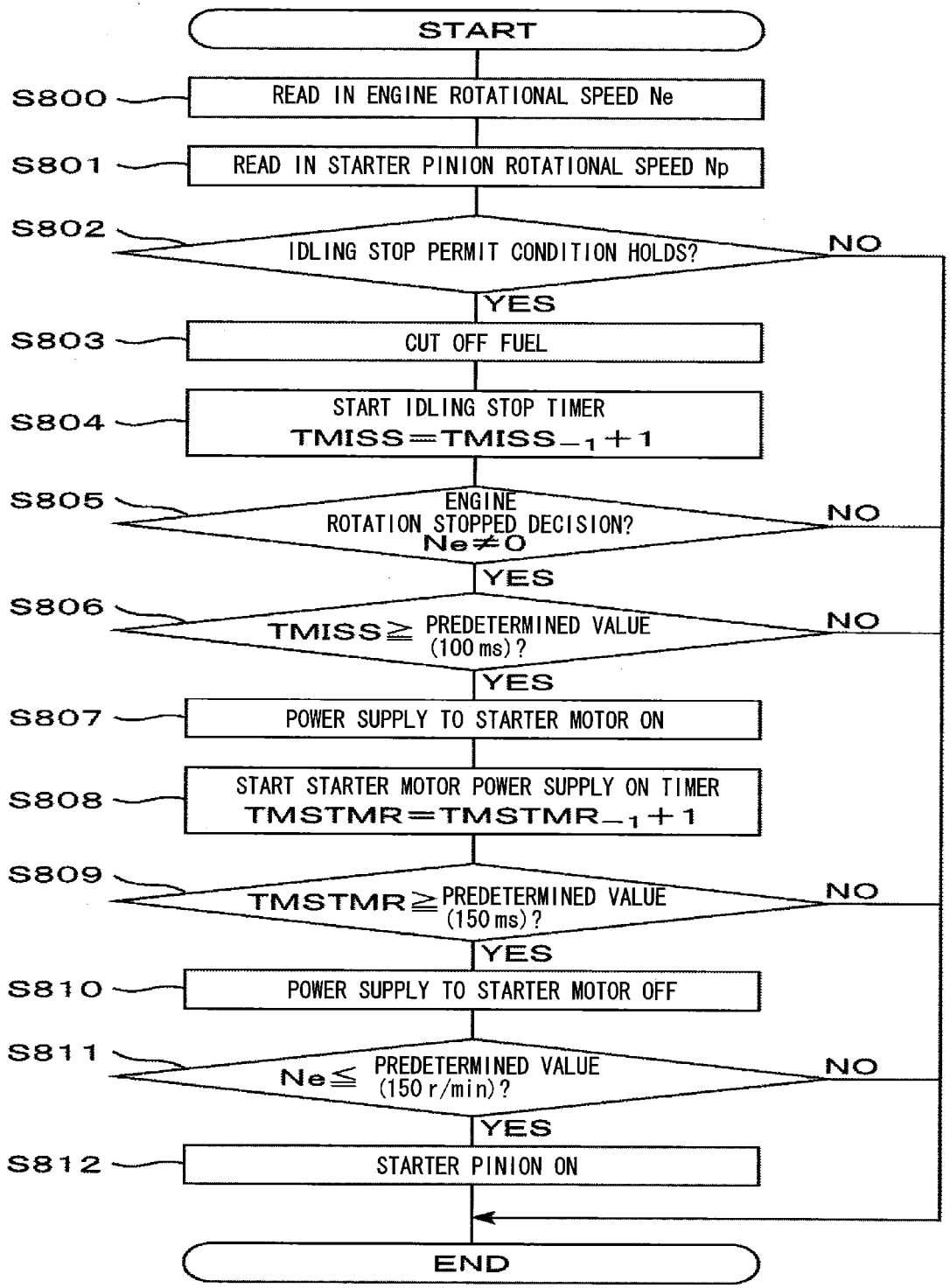

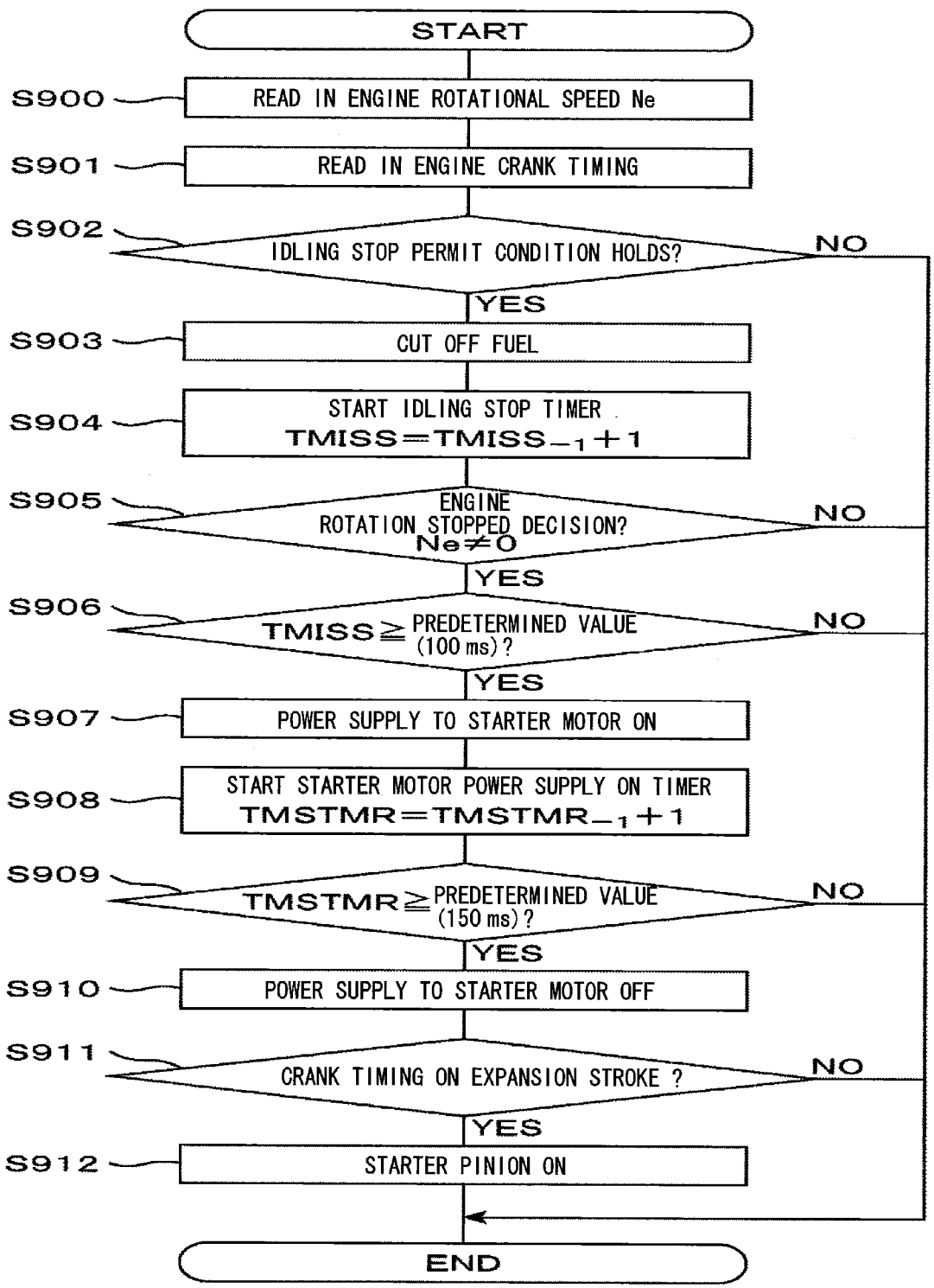

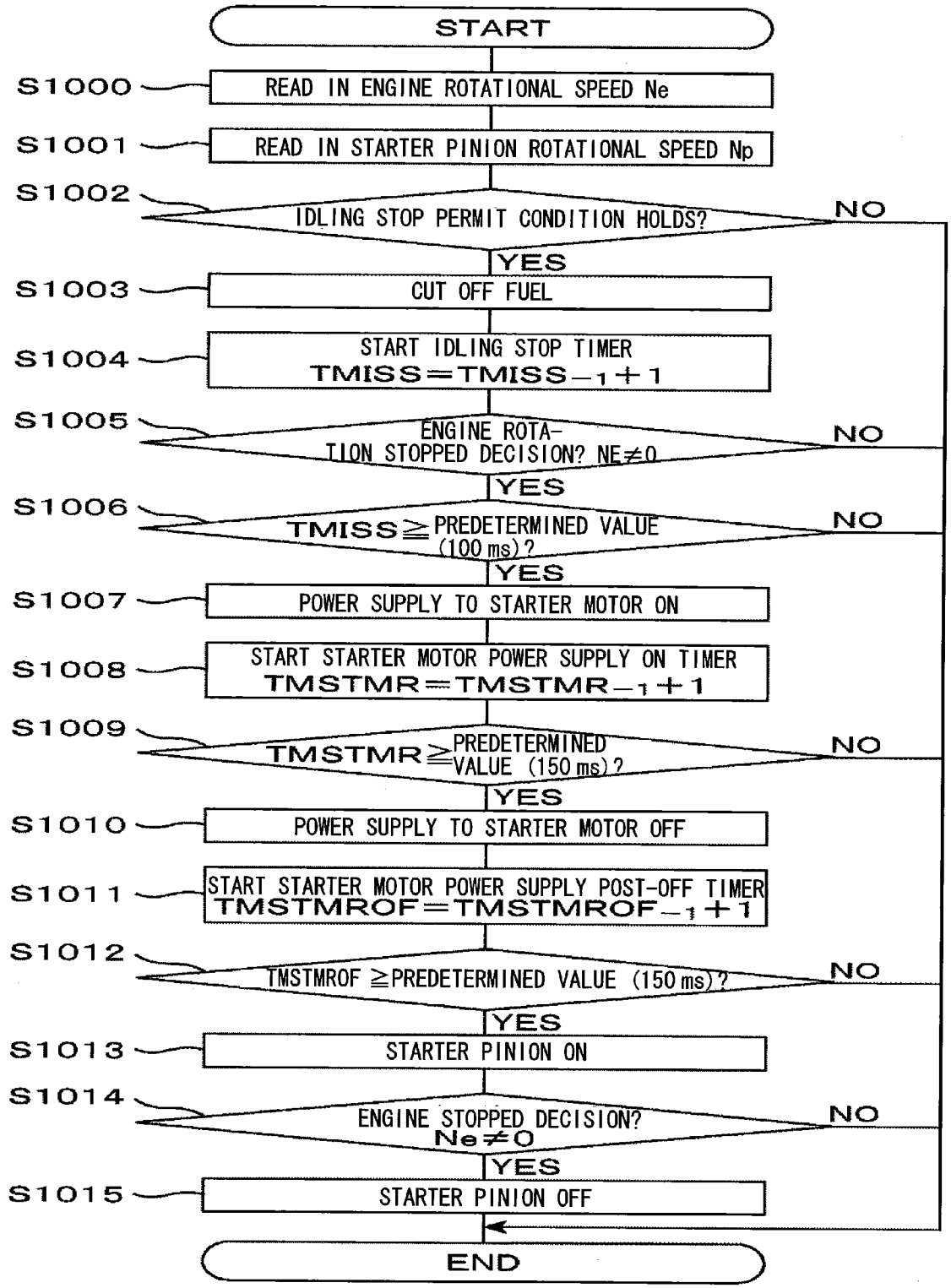

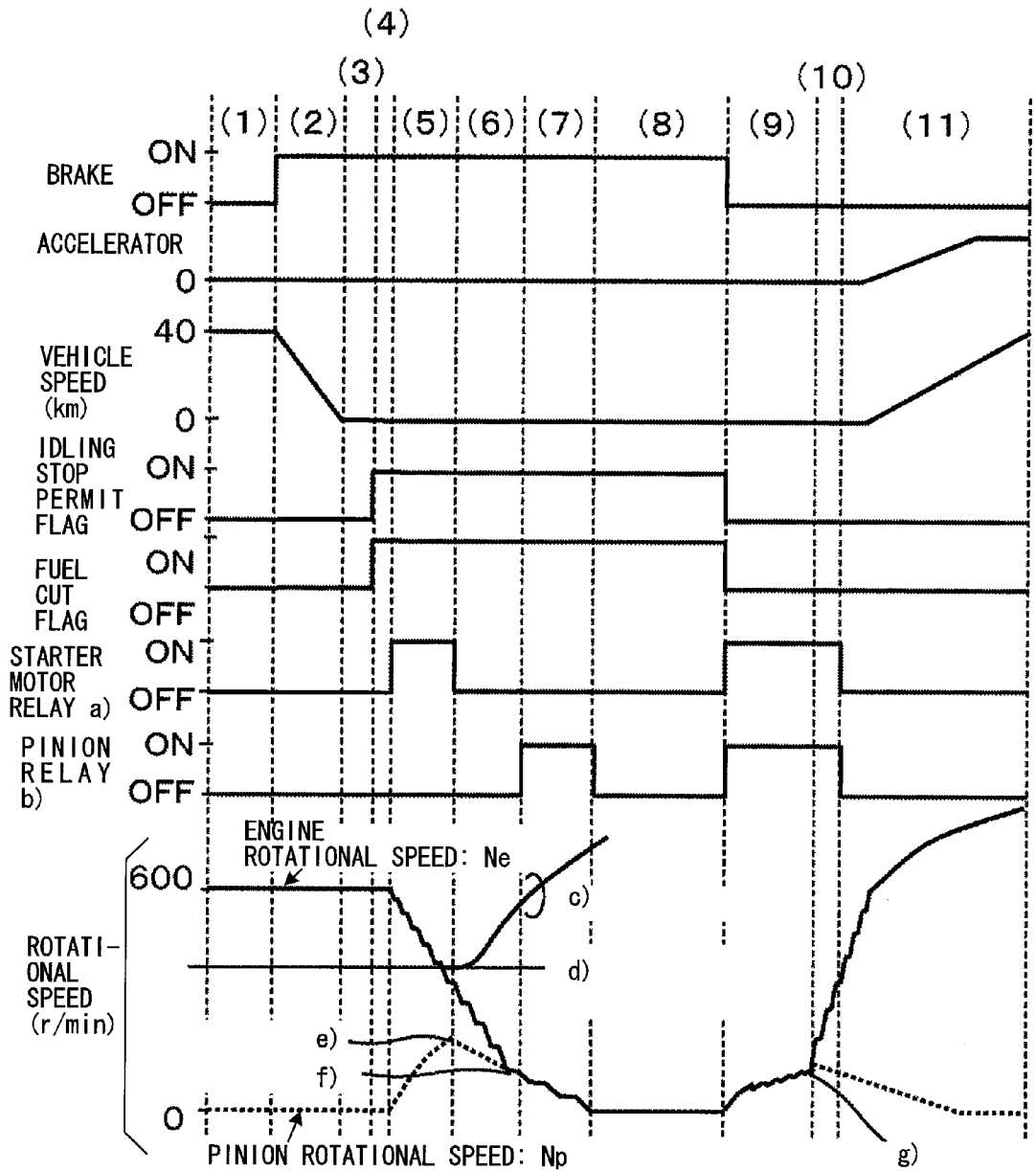

FIG.11 a) STARTER MOTOR ON TIME: POWER SUPPLIED UNDER NO STARTER LOAD, FOR TIME LONGER THAN PRE-MESH ROTATION AND CRANKING ROTATION
b) PINION ON TIMING: LOWER DURING PRE-MESH ROTATION THAN DURING NO LOAD ROTATION. OR TURNED ON AT LOWER ROTATIONAL SPEED THAN CRANKING ROTATIONAL SPEED.
c) ROTATIONAL BEHAVIOR WHEN COMBUSTION RECOMMENCES
d) ROTATIONAL SPEED AT WHICH COMBUSTION CAN RECOMMENCE (ex 400r/min)
e) NO LOAD ROTATIONAL SPEED (ex 250r/min)
f) PRE-MESH ROTATIONAL SPEED (ex 150r/min)
g) CRANKING ROTATIONAL SPEED (ex 200r/min)

VEHICLE CONTROL DEVICE AND IDLING SYSTEM

INCORPORATION BY REFERENCE

The disclosure of the following priority application is herein incorporated by reference: Japanese Patent Application No. 2009-078010 filed Mar. 27, 2009.

BACKGROUND OF THE INVENTION

1. Field of the Invention

The present invention relates to a vehicle control device that controls an onboard device, and to an idling stop system for an engine.

2. Description of the Related Art

While a vehicle is being driven, in order to economize energy resources and to preserve the environment, it has been considered to pause the operation of the vehicle engine when a predetermined condition for such engine pausing holds, and this has also been implemented upon some automobiles (hereinafter this will be termed "idling stop"). Furthermore, with the objects of shortening the time for restarting after the engine has stopped, and of shortening the restart time if a restart request arrives during idling stop while the engine is still rotating due to inertia, it has been proposed (for example, refer to Japanese Patent No. 4,211,208), to perform speed-regulated power supply to the starter motor while the engine is rotating due to inertia, thus engaging the starter gear with the engine before the engine rotation is stopped (hereinafter this will be termed "pre-meshing").

SUMMARY OF THE INVENTION

With a structure such as that described above in which speed-regulated power supply is performed to the starter motor before the engine rotation is stopped and the pinion gear is engaged with the engine, the collision torque when the pinion gear collides with the engine becomes large, because the direction of angular acceleration of the engine rotation and the direction of angular acceleration of the starter pinion are different. The object of the present invention is to suppress the collision torque when the pinion gear is engaged with the engine.

According to the 1st aspect of the present invention, a vehicle control device, comprising a vehicle control unit that controls engagement between an engine and a starter motor for starting the engine, wherein the vehicle control unit, along with cutting off fuel supply to the engine and causing the engine to rotate inertially, also, in a state in which fuel supply to the engine is cut off and the starter motor is not engaged with the engine, rotates the starter motor, and thereafter controls supply of electrical power to the starter motor so as to causes the starter motor to rotate inertially, and engages the starter motor to the engine while both the engine and the starter motor are performing inertial rotation.

According to the 2nd aspect of the present invention, in the vehicle control device according to the 1st aspect, it is preferred that the starter motor is engaged with the engine when a rotational speed of the engine and a rotational speed of the starter motor are the same, or when a difference between a rotational speed of the engine and a rotational speed of the starter motor has become less than or equal to a predetermined value.

According to the 3rd aspect of the present invention, in the vehicle control device according to the 1st aspect, it is preferred that the starter motor is engaged with the engine when a direction of angular acceleration of the engine and a direction of angular acceleration of the starter motor are the same, or when a difference between a angular acceleration of the engine and an angular acceleration of the starter motor is less than or equal to a predetermined value.

According to the 4th aspect of the present invention, in the vehicle control device according to the 1st aspect, it is preferred that timing of supply of electrical power to the starter motor is controlled according to an angular acceleration of the engine during inertial rotation.

According to the 5th aspect of the present invention, in the vehicle control device according to the 1st aspect, it is preferred that the starter motor and the engine are engaged when rotational speed of the engine is less than or equal to the first predetermined value.

According to the 6th aspect of the present invention, in the vehicle control device according to the 1st aspect, it is preferred that the starter motor is engaged to the engine when, the engine rotating inertially is at its expansion stroke, or when, the engine rotating inertially changes its angular velocity.

According to the 7th aspect of the present invention, in the vehicle control device according to the 1st aspect, it is preferred that engagement between the engine and the starter motor is continued until the engine rotation stops.

According to the 8th aspect of the present invention, in the vehicle control device according to the 1st aspect, it is preferred that a load of the engine is controlled or the starter motor is controlled so that an angular acceleration of the engine and an angular acceleration of the starter motor are the same, or their difference is within a predetermined range.

According to the 9th aspect of the present invention, in the vehicle control device according to the 1st aspect, it is preferred that the starter motor and the engine are engaged when a rotational speed of the starter motor is greater than or equal to a predetermined value.

According to the 10th aspect of the present invention, an idling stop system, comprising an idling stop control unit that, along with pausing the operation of an engine when a predetermined condition for permitting engine pausing is valid, also controls engagement between the engine and a starter motor for restarting the engine, wherein the idling stop control unit, when the predetermined condition has become valid, along with cutting off fuel supply to the engine so that the engine performs inertial rotation, also, in a state in which fuel supply is cut off, and the starter motor is not engaged with the engine, rotates the starter motor, and thereafter controls supply of electrical power to the starter motor so as to cause the starter motor perform inertial rotation, and engages the starter motor to the engine while both the engine and the starter motor are performing inertial rotation.

According to the 11th aspect of the present invention, in the idling stop system according to the 10th aspect, it is preferred that the starter motor is engaged with the engine when a rotational speed of the engine and a rotational speed of the starter motor are the same, or when a difference between a rotational speed of the engine and a rotational speed of the starter motor has become less than or equal to a predetermined value.

According to the 12th aspect of the present invention, in the idling stop system according to the 10th aspect, it is preferred that the starter motor is engaged with the engine when a direction of angular acceleration of the engine and a direction of angular acceleration of the starter motor are the same, or when a difference between an angular acceleration of the engine and an angular acceleration of the starter motor is less than or equal to a predetermined value.

According to the 13th aspect of the present invention, in the idling stop system according to the 10th aspect, it is preferred that timing of supply of electrical power to the starter motor is controlled according to an angular acceleration of the engine during inertial rotation.

According to the 14th aspect of the present invention, in the idling stop system according to the 10th aspect, it is preferred that the starter motor and the engine are engaged when rotational speed of the engine is less than or equal to a predetermined value.

According to the 15th aspect of the present invention, in the idling stop system according to the 10th aspect, it is preferred that the starter motor is engaged to the engine when, the engine rotating inertially is at its expansion stroke, or when, the engine rotating inertially changes its angular velocity.

According to the 16th aspect of the present invention, in the idling stop system according to the 10th aspect, it is preferred that engagement between the engine and the starter motor is continued until the engine rotation stops.

According to the 17th aspect of the present invention, in the idling stop system according to the 10th aspect, it is preferred that a load of the engine is controlled or the starter motor is controlled so that an angular acceleration of the engine and an angular acceleration of the starter motor are the same, or their difference is within a predetermined range.

According to the 18th aspect of the present invention, in the idling stop system according to the 10th aspect, it is preferred that the starter motor and the engine are engaged when a rotational speed of the starter motor is greater than or equal to a predetermined value.

According to the present invention, with a structure in which pre-meshing is performed before the engine rotation stops, it is possible to prevent collision torque upon the gear, and to engage the starter motor with the engine smoothly.

BRIEF DESCRIPTION OF THE DRAWINGS

FIG. 8 is a flow chart showing a fifth embodiment;
FIG. 9 is a flow chart showing a sixth embodiment;
FIG. 10 is a flow chart showing a seventh embodiment;
and
FIG. 11 is an idling stop timing chart.

DESCRIPTION OF THE PREFERRED EMBODIMENTS

With a prior art structure in which, when during driving of a automobile a condition for idling stop to be permitted becomes valid, fuel cut-off is performed, and a system for idling stop performs speed-regulated operation of the starter motor before the engine rotation stops so as to engage the pinion gear with the engine, the collision torque when the pinion gear collides with the engine becomes great because the direction of angular acceleration of the engine rotation and the direction of angular acceleration of the starter pinion are different, and there is a possibility of problems occurring with regard to wear and tear upon the ring gear and the pinion during engagement, and with regard to durability. Moreover, since the collision torque is large, it is not possible to perform the engagement smoothly, and also there is a possibility that noise due to collision of the ring gear with the pinion and engagement noise at the instant of meshing may be generated. Thus, for an automobile of this type in which fuel consumption is economized, the most important problems to be solved are durability and wear resistance of the starter system, quietness, and rapid restarting as a result of smooth gear meshing. In the following, embodiments of the present invention for solving the problems described above will be explained.

Figure 1:
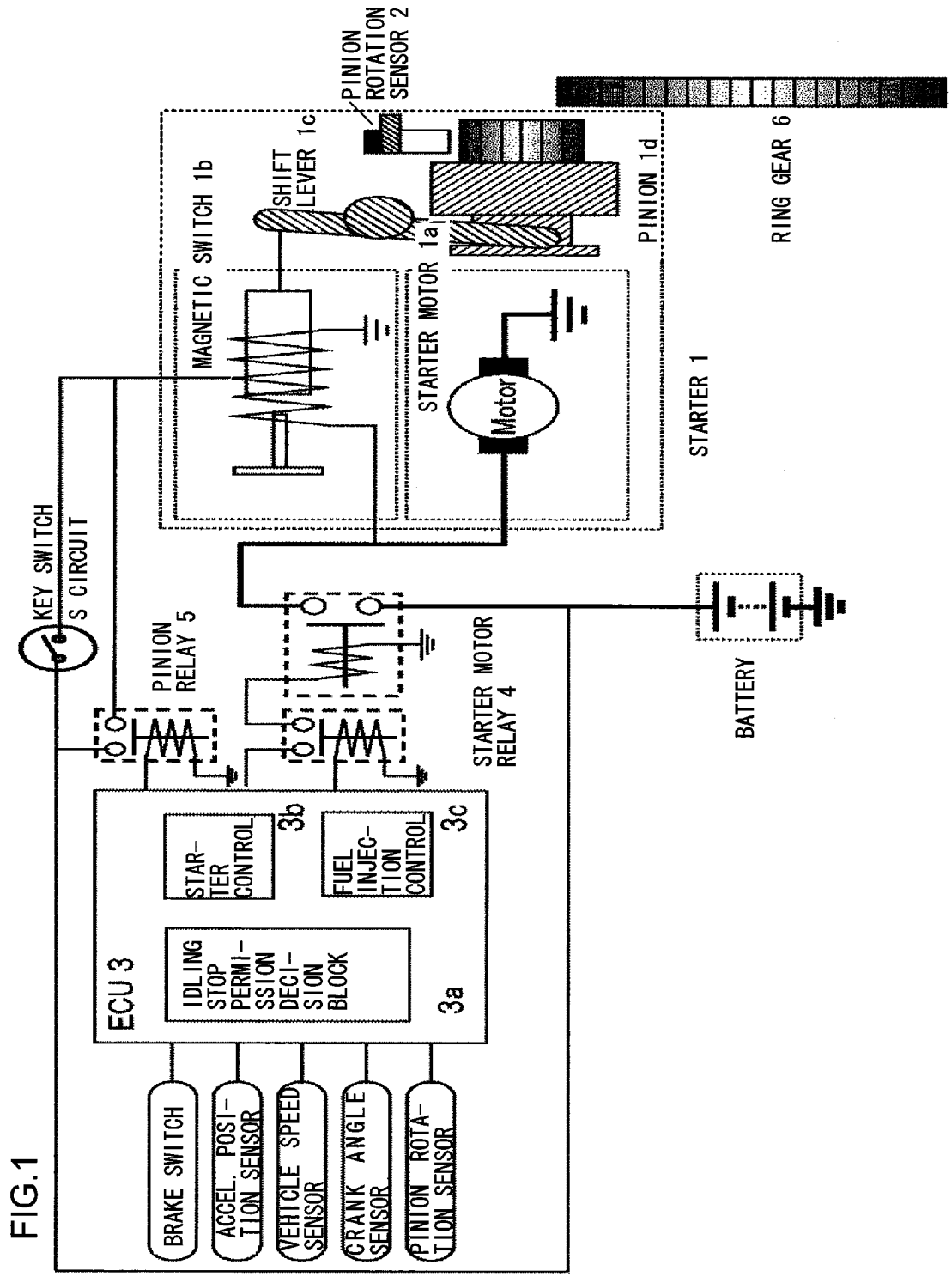
FIG. 1 is a functional structural diagram of an idling stop system.

FIG. 1 is a functional structural diagram of the idling stop system of the present invention.

A starter main body 1 includes a starter motor 1$a$, a magnetic switch 1$b$, a shift lever 1$c$, and a pinion 1$d$. The starter motor 1$a$ and the magnetic switch 1$b$ are controlled by output from an ECU (Engine Control Unit) 3 via independent power supply relays (a starter motor relay 4 and a pinion relay 5). In this construction, the starter motor 1$a$ and the pinion 1$d$ are connected together so that when the starter motor 1$a$ rotates the pinion 1$d$ is also rotated, and, when the magnetic switch 1$b$ is supplied with electrical power, the pinion gear (hereinafter termed the "pinion") 1$d$ is pressed out by the shift lever 1$c$ and is engaged with the ring gear 6. In other words, the control of operation of the starter motor and the control of engagement between the starter motor and the engine can be performed independently of one another. Moreover, the rotation of the pinion 1$d$ is detected by a pinion rotation sensor 2.

Although this feature is not shown in the figure, in addition to normal control of fuel injection, ignition, and air (electronic throttle control), the ECU 3 also executes an idling stop permission decision with an idling stop permission decision block 3$a$, according to sensor information of various types such as information from a brake switch, a vehicle speed sensor, and so on, and, according to the result of this idling stop permission decision, performs fuel cut with a fuel injection control block 3$c$ and performs control of the starter motor relay 4 and the pinion relay 5 with a starter control block 3$b$.

Figure 2:
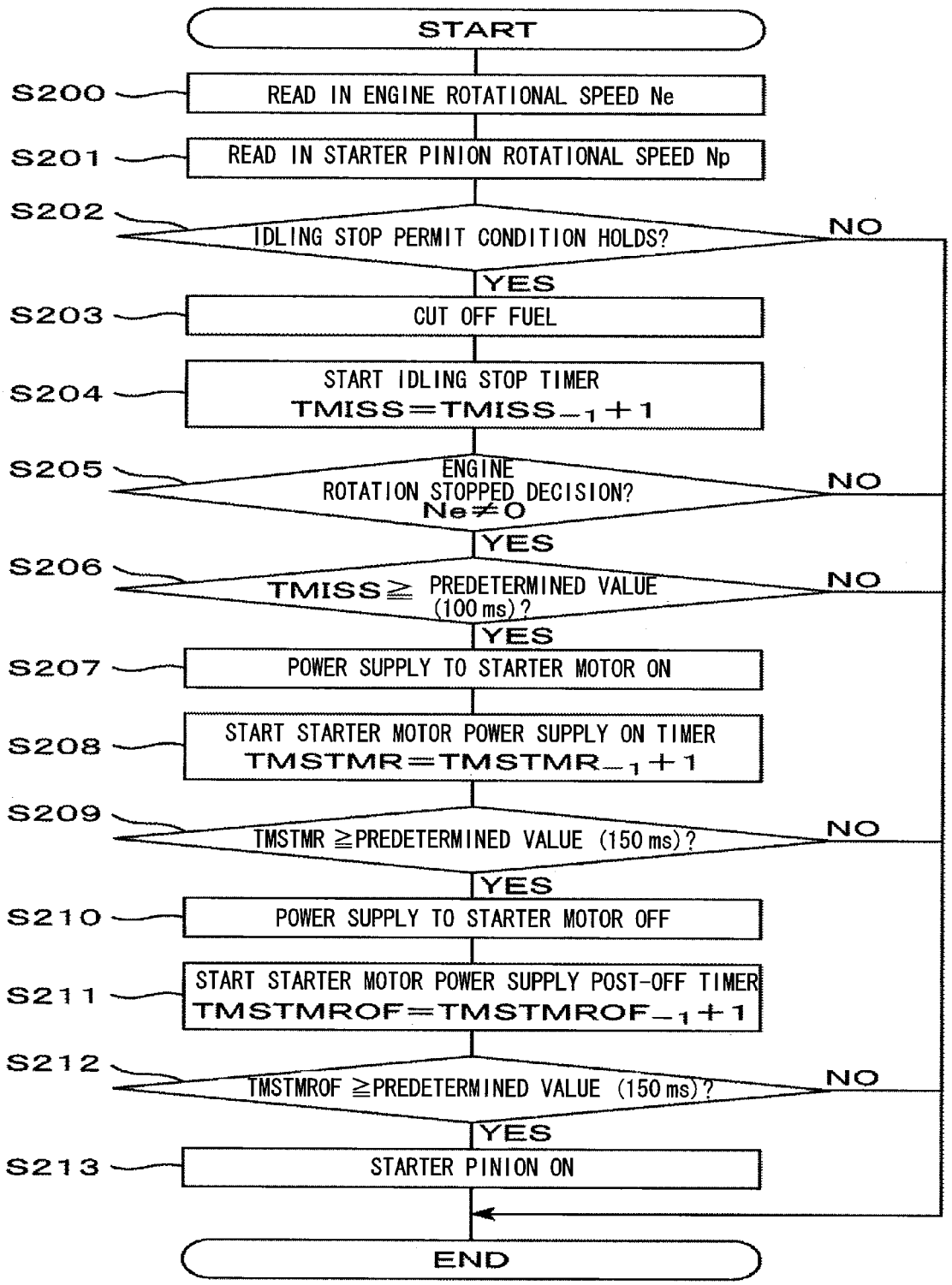
FIG. 2 is a flow chart showing a first embodiment.

FIG. 2 is a flow chart showing a first embodiment of the present invention. This processing flow is repeatedly executed at a fixed time interval (for example, every 10 ms)

In a step S200, the ECU 3 reads in the engine rotational speed Ne that is calculated on the basis of crank angle sensor information, and then in a step S201 it reads in the starter pinion rotational speed Np that is calculated based upon the starter pinion rotational sensor. It should be understood that although here the starter pinion rotational speed is measured directly, it would also be acceptable more simply to estimate the rotation of the pinion from the voltage at the motor terminal. Then in a step S202 a decision is made as to whether or not to perform idling stop, according to the various types of sensor information described in FIG. 1. If this idling stop permission decision is affirmative the flow of control proceeds to a step S203, while if it is negative this processing terminates. If in the step S202 it is decided that the idling stop permission decision is affirmative, then in the step S203 fuel cut-off processing is performed. After fuel cut-off, in a step S204 an idling stop timer TMISS is started, and then the flow of control proceeds to a step S205. TMISS$_{-1}$ means the value of this timer the previous time this processing was executed, so that the value for this timer is incremented each time this processing is performed at the fixed time interval. In the step S205 a decision is made as to whether or not the engine rotation is stopped, and if the engine rotation is not stopped then it is decided that the engine is still rotating after fuel cut-off due to inertia, while if the decision is negative then it is decided that the engine rotation is stopped and this processing terminates. Next in a step S206, if the time elapsed upon the idling stop timer is greater than or equal to a predetermined value (for example 100 ms), then the flow of control proceeds to a step S207, in which supply of electrical power to the starter motor is commenced. Here the reason for setting the engine stop timer to this predetermined value (for example 100 ms) is that the speed of inertial engine rotation may become different due to engine friction and so on, and so this value is set to a value that matches the condition of the engine. Moreover, this is also for suppressing the supply of electrical power to the starter motor when it is not necessary for the starter motor to rotate, as for example is the case in the event that the brake pedal has been released immediately after the idling stop permit condition has become valid, or the like. After start of power supply to the starter motor, in a step S208 a starter motor power supply ON timer TMSTMR is started, and then the flow of control proceeds to a step S209. $TMSTMR_{-1}$ means the value of this timer the previous time this processing was executed, so that the value for this timer is incremented each time this processing is performed at the fixed time interval. Then, in a step S209, if TMSTMR is greater than or equal to some predetermined time period (for example 150 ms), then it is determined that the starter pinion rotational speed has been sufficiently elevated, and the flow of control proceeds to a step S210, in which the supply of electrical power to the starter motor is turned OFF. If TMSTMR has not been running for the predetermined time period, then the supply of electrical power is continued.

In the step S210 the supply of electrical power to the starter motor is turned OFF, and, due to this starter motor power supply being turned OFF, the starter motor transits to its phase of inertial rotation, and then in a step S211 a starter motor power supply post-OFF timer TMSTMROF is started, and the flow of control proceeds to a step S212. In this step S212, if the interval timed by the timer TMSTMROF is greater than or equal to some predetermined time period (for example 150 ms), the starter pinion is turned ON, so that the pinion gear is engaged with the ring gear. It should be understood that, while in the present invention inertial rotation is described as being a state in which the rotational angular velocity is behaving so that the rotational speed is decreasing, this not only includes a state in which the supply of fuel to the engine or power to the motor is interrupted, but also includes a state in which, in order to adjust the rate of rotational speed decrease, control of the rotational angular velocity is performed by PWM control in which the duty ratio at which the power supply to the motor is turned ON and OFF is varied within a range in which the rotational speed is not elevated, or the like. Since in this embodiment the rotating engine and the rotating starter pinion are engaged together while they are both rotating inertially, accordingly the collision torque between the ring gear and the pinion is mitigated, and it becomes possible for the engagement between the engine and the starter motor to be performed smoothly; and furthermore, along with the noise of collision during engagement and the noise of meshing being reduced, it is also possible to alleviate wear and tear upon the ring gear and the pinion.

Figure 3:
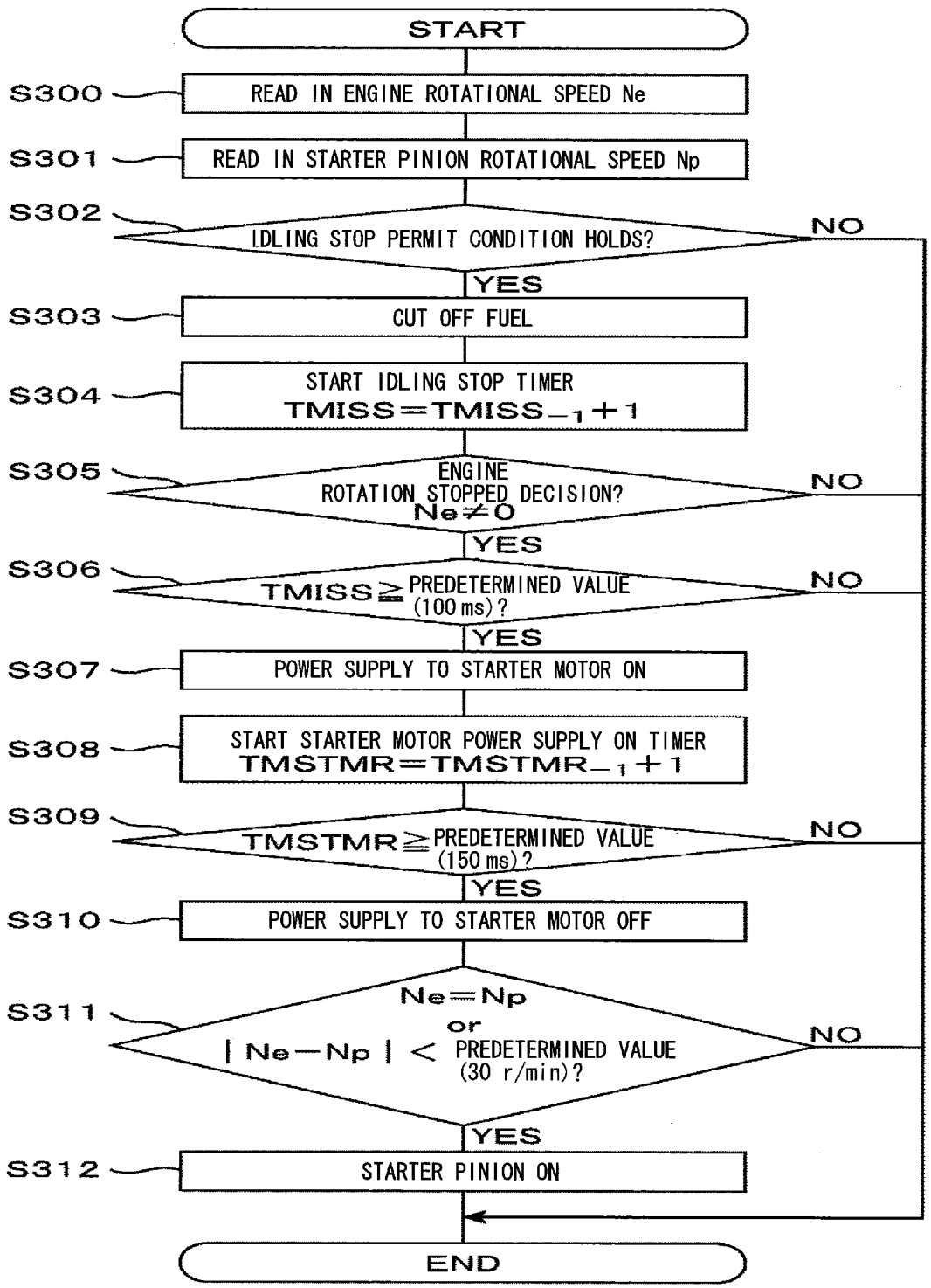
FIG. 3 is a flow chart showing a second embodiment.

FIG. 3 is a flow chart showing a second embodiment of the present invention. This processing flow is executed at fixed time intervals (for example, every 10 ms).

In a step S300, the ECU 3 reads in the engine rotational speed Ne that is calculated on the basis of crank angle sensor information, and then in a step S301 it reads in the starter pinion rotational speed Np that is calculated based upon the starter pinion rotational sensor. Then in a step S302 a decision is made as to whether or not to perform idling stop, according to the various types of sensor information described in FIG. 1. If this idling stop permission decision is affirmative the flow of control proceeds to a step S303, while if it is negative this processing terminates. If in the step S302 it is decided that the idling stop permission condition is affirmative, then in the step S303 fuel cut-off processing is performed. After fuel cut-off, in a step S304 an idling stop timer TMISS is started, and then the flow of control proceeds to a step S305. $TMISS_{-1}$ means the value of this timer the previous time this processing was executed, so that the value for this timer is incremented each time this processing is performed at the fixed time interval. In the step S305 a decision is made as to whether or not the engine rotation is stopped, and if the engine rotation is not stopped then it is decided that the engine is still rotating after fuel cut-off due to inertia, while if the decision is negative then it is decided that the engine rotation is stopped and this processing terminates. Next in a step S306, if the time elapsed upon the idling stop timer is greater than or equal to a predetermined value (for example 100 ms), then the flow of control proceeds to a step S307, in which supply of electrical power to the starter motor is commenced. After the commencement of power supply to the starter motor, in a step S308 a starter motor power supply ON timer TMSTMR is started, and then the flow of control proceeds to a step S309. $TMSTMR_{-1}$ means the value of this timer the previous time this processing was executed, so that the value for this timer is incremented each time this processing is performed at the fixed time interval. Then, in a step S309, if TMSTMR is greater than or equal to some predetermined time period (for example 150 ms), then it is determined that the starter pinion rotational speed has been sufficiently elevated, and the flow of control proceeds to a step S310, in which the supply of electrical power to the starter motor is turned OFF. But if TMSTMR has not been running for the predetermined time period, then the supply of electrical power is continued.

In the step S310 the supply of electrical power to the starter motor is turned OFF, and, due to this starter motor power supply being turned OFF, the starter motor transits to its phase of inertial rotation. Next in a step S311, if the engine rotational speed Ne and the pinion rotational speed Np are equal, or if the absolute value of the difference between the engine rotational speed Ne and the pinion rotational speed Np is less than or equal to a predetermined value, then the flow of control proceeds to a step S312, in which the starter pinion is turned ON. Moreover, while in this decision of the step S311 the difference between the engine rotational speed and the pinion rotational speed is taken, their ratio may be taken instead.

Since in this embodiment the rotating engine and the rotating starter pinion are engaged together while they are both rotating inertially, and moreover they are engaged together when the rotational speed of the engine and the rotational speed of the pinion are almost the same, accordingly the collision torque between the ring gear and the pinion is mitigated, and it becomes possible for the engagement between the engine and the starter motor to be performed smoothly; and furthermore, along with the noise of collision during engagement and the noise of meshing being reduced, it is also possible to alleviate wear and tear upon the ring gear and the pinion.

Figure 4:
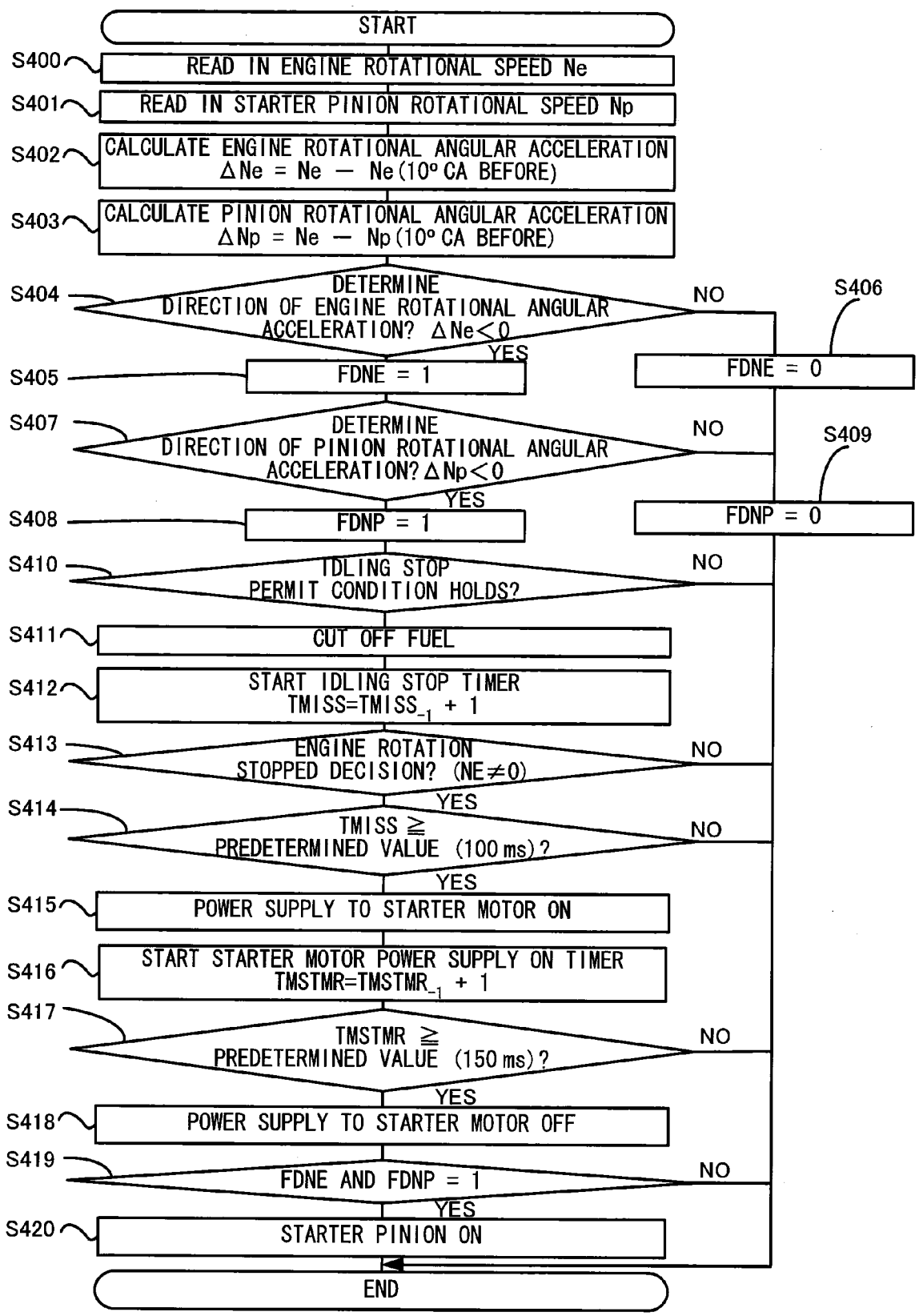
FIG. 4 is a flow chart showing a third embodiment.
Figure 5:
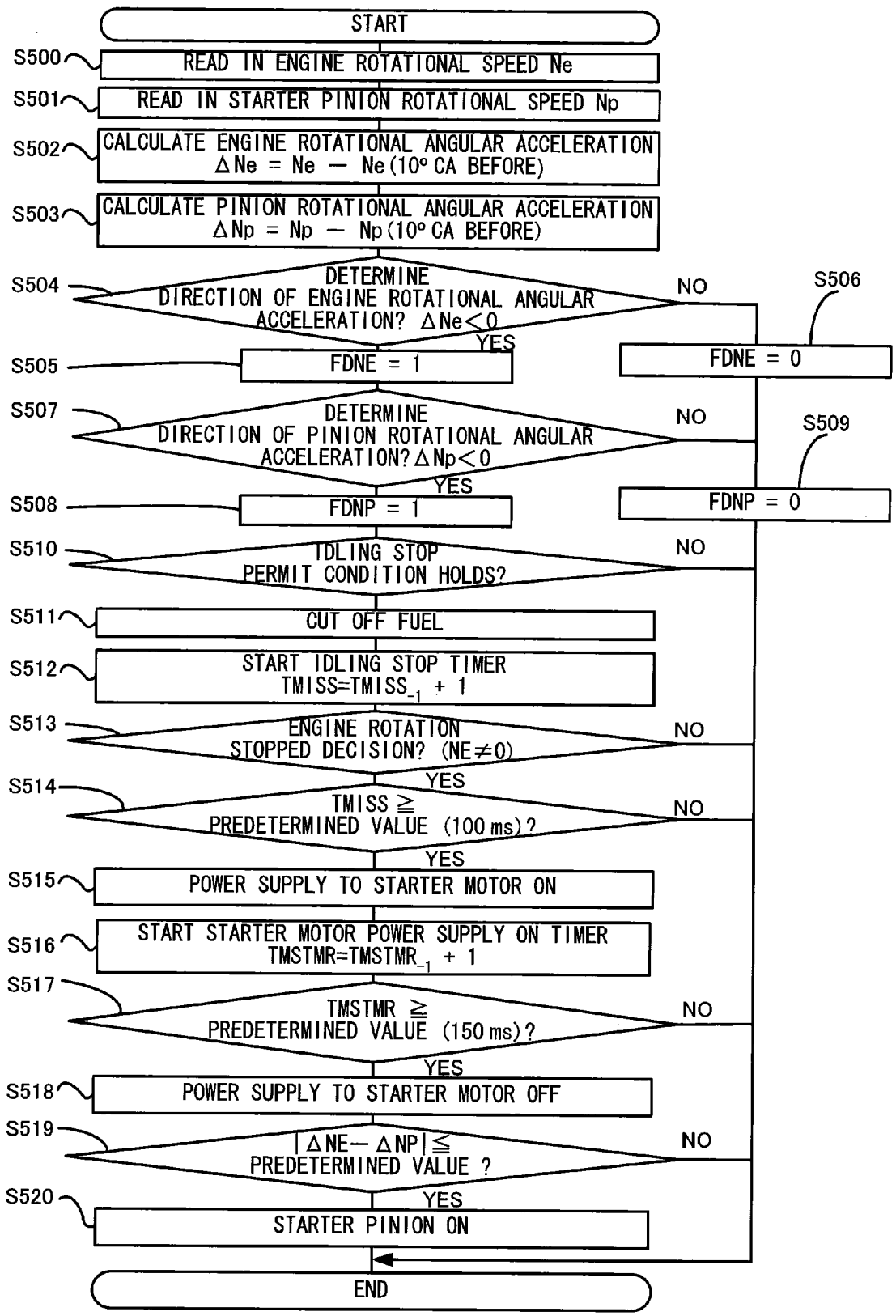
FIG. 5 is another flow chart showing the third embodiment.

FIGS. 4 and 5 are flow charts showing a third embodiment of the present invention. This processing flow is executed at fixed time intervals (for example, every 10 ms).

In a step S400, the ECU 3 reads in the engine rotational speed Ne that is calculated on the basis of crank angle sensor information, and then in a step S401 it reads in the starter pinion rotational speed Np that is calculated based upon the starter pinion rotational sensor. Then in a step S402 the engine rotational angular acceleration ΔNe is calculated. Here, simply, the difference between the engine rotational speed 10° crank angle before and the current engine rotational speed is calculated as being the angular acceleration. Then in a step S403 the pinion rotational angular acceleration $\Delta Np$ is calculated. In a step S404 a decision is made as to the direction of the engine angular acceleration. If $\Delta Ne$ is less than zero then the flow of control proceeds to a step S405, in which it is determined that the acceleration is negative and an engine acceleration direction decision flag FDNE is set to 1. However, if $\Delta Ne$ is greater than zero, then the flow of control is transferred to a step S406 in which it is determined that the acceleration is positive, and the engine acceleration direction decision flag FDNE is set to 0.

Then in a step S407 a decision is made as to the direction of the starter pinion angular acceleration. If $\Delta Np$ is less than zero then the flow of control proceeds to a step S408 in which it is determined that the acceleration is negative, and a pinion acceleration direction decision flag FDNP is set to 1. However, if $\Delta Np$ is greater than zero, then the flow of control is transferred to a step S409 in which it is determined that the acceleration is positive, and the pinion acceleration direction decision flag FDNP is set to 0.

Then in a step S410 a decision is made as to whether or not to perform idling stop, according to the various types of sensor information described in FIG. 1. If this idling stop permission decision is affirmative the flow of control proceeds to a step S411, while if it is negative this processing terminates. If in the step S410 it is decided that the idling stop permission is affirmative, then in the step S411 fuel cut-off processing is performed. After fuel cut-off, in a step S412 an idling stop timer TMISS is started, and then the flow of control proceeds to a step S413. $TMISS_{-1}$ means the value of this timer the previous time this processing was executed, so that the value for this timer is incremented each time this processing is performed at the fixed time interval. In the step S413 a decision is made as to whether or not the engine rotation is stopped, and if the engine rotation is not stopped then it is decided that the engine is still rotating after fuel cut-off due to inertia, while if the decision is negative then it is decided that the engine rotation is stopped and this processing terminates. Next in a step S414, if the time elapsed upon the idling stop timer is greater than or equal to a predetermined value (for example 100 ms), then the flow of control proceeds to a step S415, in which supply of electrical power to the starter motor is commenced. After this commencement of power supply to the starter motor, in a step S416 a starter motor power supply ON timer TMSTMR is started, and then the flow of control proceeds to a step S417. $TMSTMR_{-1}$ means the value of this timer the previous time this processing was executed, so that the value for this timer is incremented each time this processing is performed at the fixed time interval. In the step S417, if TMSTMR is greater than or equal to some predetermined time period (for example 150 ms), it is determined that the starter pinion rotational speed has been sufficiently elevated, and the flow of control proceeds to a step S418, in which the supply of electrical power to the starter motor is turned OFF. If TMSTMR has not been running for the predetermined time period, then the supply of electrical power is continued.

In the step S418 the supply of electrical power to the starter motor is turned OFF, and, due to this starter motor power supply being turned OFF, the starter motor transits to its phase of inertial rotation. Next in a step S419, the engine angular acceleration direction flag and the pinion angular acceleration direction flag are ANDed together, and if the result is 1 then the flow of control proceeds to a step S420, in which the pinion is turned ON. The reason for checking in this step S419 whether the angular accelerations of the engine and the pinion are in the same direction is that it needs to be determined whether or not the angular acceleration direction of the engine and the angular acceleration direction of the piston are the same, since the angular acceleration direction may change according to the crank timing even during inertial rotation after fuel cut-off, depending on the amount of air charged into the cylinders by repetition of the intake-compression-expansion-exhaust cycle of the engine.

Next, FIG. 5 will be explained. This processing flow is executed at fixed time intervals (for example, every 10 ms). In a step S500, the ECU 3 reads in the engine rotational speed Ne that is calculated on the basis of crank angle sensor information, and then in a step S501 it reads in the starter pinion rotational speed Np that is calculated based upon the starter pinion rotational sensor. Then in a step S502 the engine rotational angular acceleration $\Delta Ne$ is calculated. Here, simply, the difference between the engine rotational speed 10° crank angle before and the current engine rotational speed is calculated as being the angular acceleration. Then in a step S503 the pinion rotational angular acceleration $\Delta Np$ is calculated. In a step S504 a decision is made as to the direction of the engine angular acceleration. If $\Delta Ne$ is less than zero then the flow of control proceeds to a step S505, in which it is determined that the acceleration is negative and an engine acceleration direction decision flag FDNE is set to 1. However, if $\Delta Ne$ is greater than zero, then the flow of control is transferred to a step S506 in which it is determined that the acceleration is positive, and the engine acceleration direction decision flag FDNE is set to 0.

Then in a step S507 a decision is made as to the direction of the starter pinion angular acceleration. If $\Delta Np$ is less than zero then the flow of control proceeds to a step S508 in which it is determined that the acceleration is negative, and a pinion acceleration direction decision flag FDNP is set to 1. However, if $\Delta Np$ is greater than zero, then the flow of control is transferred to a step S509 in which it is determined that the acceleration is positive, and the pinion acceleration direction decision flag FDNP is set to 0.

Then in a step S510 a decision is made as to whether or not to perform idling stop, according to the various types of sensor information described in FIG. 1. If this idling stop permission decision is affirmative the flow of control proceeds to a step S511, while if it is negative this processing terminates. If in the step S510 it is decided that the idling stop permission is affirmative, then in the step S511 fuel cut-off processing is performed. After fuel cut-off, in a step S512 an idling stop timer TMISS is started, and then the flow of control proceeds to a step S513. $TMISS_{-1}$ means the value of this timer the previous time this processing was executed, so that the value for this timer is incremented each time this processing is performed at the fixed time interval. In the step S513 a decision is made as to whether or not the engine rotation is stopped, and if the engine rotation is not stopped then it is decided that the engine is still rotating after fuel cut-off due to inertia, while if the decision is negative then it is decided that the engine rotation is stopped and this processing terminates. Next in a step S514, if the time elapsed upon the idling stop timer is greater than or equal to a predetermined value (for example 100 ms), then the flow of control proceeds to a step S515, in which supply of electrical power to the starter motor is commenced. After start of power supply to the starter motor, in a step S516 a starter motor power supply ON timer TMSTMR is started, and then the flow of control proceeds to a step S517. $TMSTMR_{-1}$ means the value of this timer the previous time this processing was executed, so that the value for this timer is incremented each time this processing is performed at the fixed time interval. In the step S517, if TMSTMR is greater than or equal to some predetermined time period (for example 150 ms), then it is determined that the starter pinion rotational speed has been sufficiently elevated, and the flow of control proceeds to a step S518, in which the supply of electrical power to the starter motor is turned OFF. If TMSTMR has not been running for the predetermined time period, then the supply of electrical power is continued.

In the step S518 the supply of electrical power to the starter motor is turned OFF, and, due to this starter motor power supply being turned OFF, the starter motor transits to its phase of inertial rotation. Next in a step S519, if the difference between the engine angular acceleration and the pinion angular acceleration is less than or equal to a predetermined value, the flow of control proceeds to a step S520, and the pinion is turned ON. If not, the flow of processing terminates.

Since in this embodiment the rotating engine and the rotating starter pinion are engaged together while they are both rotating inertially, and moreover they are engaged together when the directions of the angular acceleration of the engine and the angular acceleration of the piston are the same, or when the difference between the angular acceleration of the engine and the angular acceleration of the piston is less than or equal to a predetermined value, accordingly the collision torque between the ring gear and the pinion is mitigated, and it becomes possible for the engagement between the engine and the starter motor to be performed smoothly; and furthermore, along with the noise of collision during engagement and the noise of meshing being reduced, it is also possible to alleviate wear and tear upon the ring gear and the pinion.

Figure 6:
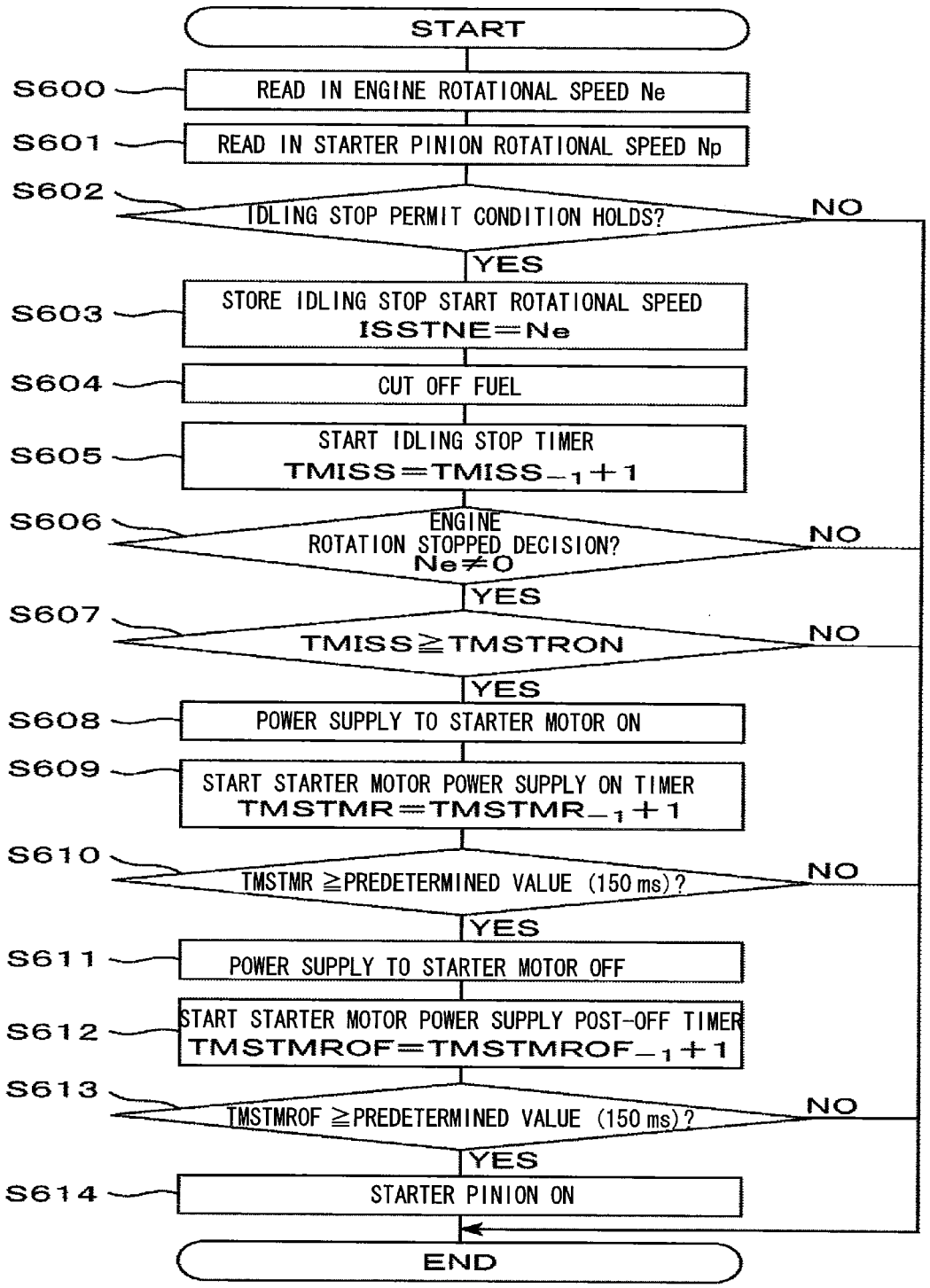
FIG. 6 is a flow chart showing a fourth embodiment.
Figure 7:
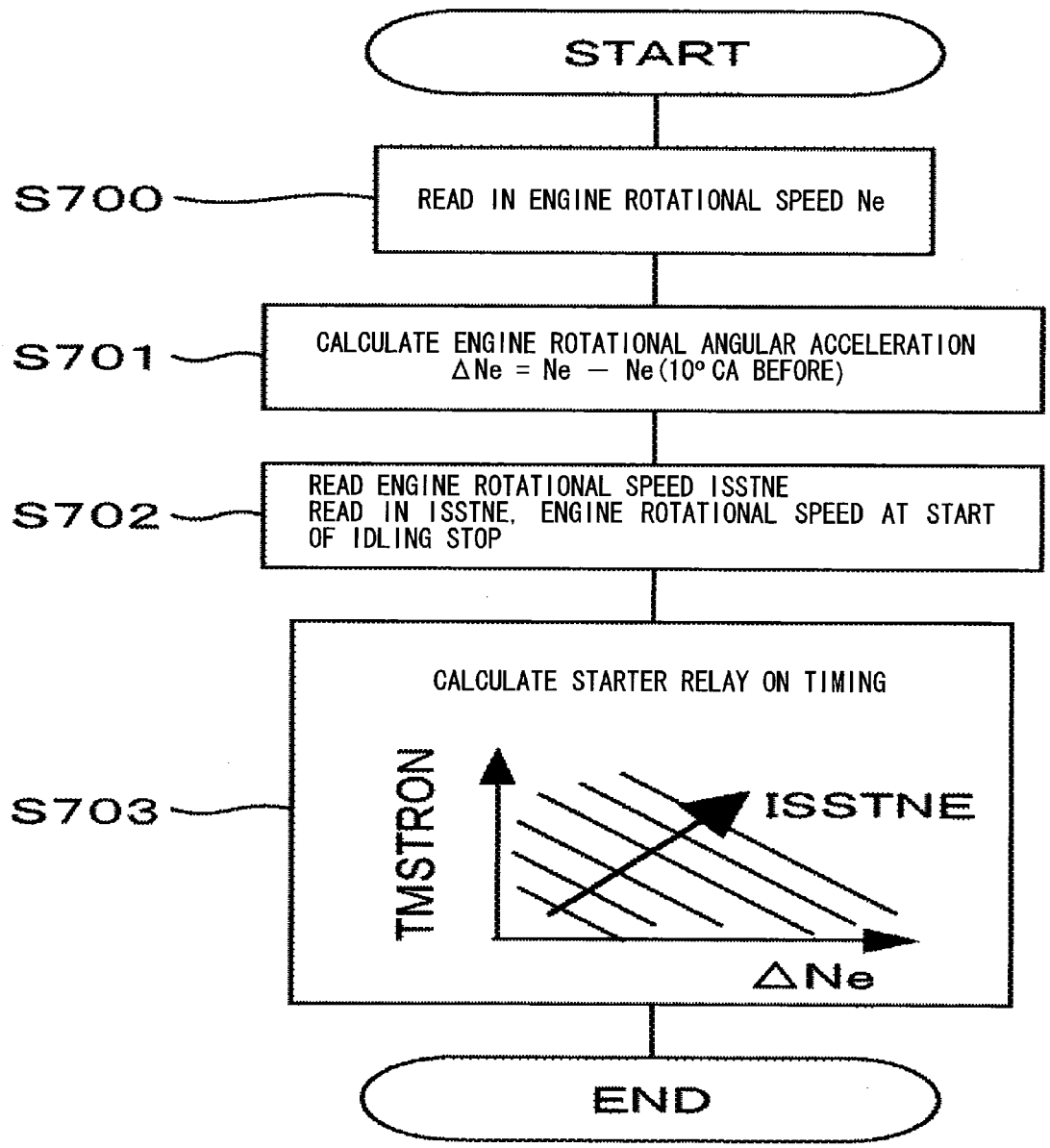
FIG. 7 is another flow chart showing the fourth embodiment.

FIGS. 6 and 7 are flow charts showing a fourth embodiment of the present invention. This processing flow is executed at fixed time intervals (for example, every 10 ms). First, FIG. 6 will be explained.

In a step S600, the ECU 3 reads in the engine rotational speed Ne that is calculated on the basis of crank angle sensor information, and then in a step S601 it reads in the starter pinion rotational speed Np that is calculated based upon the starter pinion rotational sensor. Then in a step S602 a decision is made as to whether or not to perform idling stop, according to the various types of sensor information described in FIG. 1. If this idling stop permission decision is affirmative the flow of control proceeds to a step S203, while if it is negative this processing terminates. After a decision in the step S602 that the idling stop permission is affirmative, the flow of control proceeds to the step S603, in which the engine rotational speed when idling stop was started is stored in ISSTNE. Next in a step S604 fuel cut-off processing is performed. After fuel cut-off, in a step S605 an idling stop timer TMISS is started, and then the flow of control proceeds to a step S606. TMISS$_{-1}$ means the value of this timer the previous time this processing was executed, so that the value for this timer is incremented each time this processing is performed at the fixed time interval. In the step S606 a decision is made as to whether or not the engine rotation is stopped, and if the engine rotation is not stopped then it is decided that the engine is still rotating after fuel cut-off due to inertia, while if the decision is negative then it is decided that the engine rotation is stopped state and this processing terminates. Next in a step S607, if the time elapsed upon the idling stop timer is greater than or equal to TMSTRON, then the flow of control proceeds to a step S608, in which supply of electrical power to the starter motor is commenced. It should be understood that TMSTRON as compared with the idling stop timer TMISS is explained in FIG. 7.

After start of power supply in the step S608 to the starter motor, in a step S609 a starter motor power supply ON timer TMSTMR is started, and then the flow of control proceeds to a step S610. TMSTMR$_{-1}$ means the value of this timer the previous time this processing was executed, so that the value for this timer is incremented each time this processing is performed at the fixed time interval. In the step S610, if TMSTMR is greater than or equal to some predetermined time period (for example 150 ms), then it is determined that the starter pinion rotational speed has been sufficiently elevated, and the flow of control proceeds to a step S611, in which the supply of electrical power to the starter motor is turned OFF. If TMSTMR has not been running for the predetermined time period, then the supply of electrical power is continued.

In the step S611 the supply of electrical power to the starter motor is turned OFF, and, due to this starter motor power supply being turned OFF, the starter motor transits to its phase of inertial rotation; and then in a step S612 a starter motor power supply post-OFF timer TMSTMROF is started, and the flow of control proceeds to a step S613. In this step S613, if the interval timed by the timer TMSTMROF is greater than or equal to some predetermined time period (for example 150 ms), the starter pinion is turned ON, so that the pinion gear is engaged with the ring gear.

FIG. 7 is a flow chart for determining the time period for starting the supply of electrical power to the starter motor. In a step S700, the ECU 3 reads in the engine rotational speed Ne, and then in a step S701 it calculates the engine rotational angular acceleration ΔNe. Next in a step S702 it reads in the idling stop start rotational speed ISSTNE, and in a step 703 a starting time for the supply of electrical power to the starter motor TMSTRON is searched by referring to a table, according to ΔNe and ISSTNE. It should be understood that, while the details of power supply timing control for the starter motor have been explained as above, it would also be acceptable to be arranged to control the engine rotational speed to a desired motor rotational speed by feedback, by controlling the changeover duty ratio between ON and OFF by PWM control.

Since in this embodiment the collision torque between the ring gear and the pinion is mitigated due to the rotating engine and the rotating starter pinion being engaged together while they are both rotating inertially, accordingly it becomes possible for the engagement between the engine and the starter motor to be performed smoothly; and furthermore, along with it being possible to reduce the noise of collision during engagement and the noise of meshing and to mitigate wear and tear upon the ring gear and the pinion, since it is possible to control the timing of supply of electrical power to the starter according to the idling stop starting rotational speed and the angular acceleration of the engine at that time, accordingly it is possible to prevent meshing between the starter pinion and the ring gear at a timing other than that anticipated, due to individual variability of engine, differences in the set idling rotational speed, differences in the shift lever position, or the like.

FIG. 8 is a flow chart showing a fifth embodiment of the present invention. This processing flow is executed at fixed time intervals (for example, every 10 ms).

In a step S800, the ECU 3 reads in the engine rotational speed Ne that is calculated on the basis of crank angle sensor information, and then in a step S801 it reads in the starter pinion rotational speed Np that is calculated based upon the starter pinion rotational sensor. Then in a step S802 a decision is made as to whether or not to perform idling stop, according to the various types of sensor information described in FIG. 1. If this idling stop permission decision is affirmative the flow of control proceeds to a step S803, in which fuel cut-off processing is performed. After fuel cut-off, in a step S804 an idling stop timer TMISS is started, and then the flow of control proceeds to a step S805. TMISS$_{-1}$ means the value of this timer the previous time this processing was executed, so that the value for this timer is incremented each time this processing is performed at the fixed time interval. In the step S805 a decision is made as to whether or not the engine rotation is stopped, and if the engine rotation is not stopped then it is decided that the engine is still rotating after fuel cut-off due to inertia, while if the decision is negative then it is decided that the engine rotation is stopped state and this processing terminates. Next in a step S806, if the time elapsed upon the idling stop timer is greater than or equal to a predetermined value (for example 100 ms), then the flow of control proceeds to a step S807, in which supply of electrical power to the starter motor is commenced. After start of power supply to the starter motor, in a step S808 a starter motor power supply ON timer TMSTMR is started, and then the flow of control proceeds to a step S809. TMSTMR$_{-1}$ means the value of this timer the previous time this processing was executed, so that the value for this timer is incremented each time this processing is performed at the fixed time interval. In the step S809, if TMSTMR is greater than or equal to some predetermined time period (for example 150 ms), then it is determined that the starter pinion rotational speed has been sufficiently elevated, and the flow of control proceeds to a step S810, in which the supply of electrical power to the starter motor is turned OFF. If TMSTMR has not been running for the predetermined time period, then the supply of electrical power is continued.

In the step S810 the supply of electrical power to the starter motor is turned OFF, and, due to this starter motor power supply being turned OFF, the starter motor transits to its phase of inertial rotation; and then, after this turning of the starter motor power supply OFF in the step S810, the flow of control proceeds to a step S811, in which, if the engine rotational speed is less than or equal to a predetermined rotational speed (for example 200 r/min), then the starter pinion is turned ON, and the pinion gear is engaged with the ring gear. Although it is desirable for this predetermined rotational speed to be as low as possible, at a maximum, it should be set to a value lower than the normal starter cranking rotational speed.

Since in this embodiment the rotating engine and the rotating starter pinion are engaged together while they are both rotating inertially, accordingly the collision torque between the ring gear and the pinion is mitigated, and it becomes possible for the engagement between the engine and the starter motor to be performed smoothly; and furthermore, along with the noise of collision during engagement and the noise of meshing being reduced, it is also possible to alleviate wear and tear upon the ring gear and the pinion. Moreover, since the rotational speed at which the pinion gear and the ring gear are engaged with one another is low, accordingly the time period until the engine stops becomes short, so that it is possible to reduce the frequency of generation of noise due to play such as backlash or the like between the pinion gear and the ring gear after they are engaged together.

FIG. 9 is a flow chart showing a sixth embodiment of the present invention. This processing flow is executed at fixed time intervals (for example, every 10 ms).

In a step S900, the ECU 3 reads in the engine rotational speed Ne that is calculated on the basis of crank angle sensor information, and then in a step S901 it reads in the crank timing of the engine, and determines from this crank timing that in which stroke the engine is on. Then in a step S902 a decision is made as to whether or not to perform idling stop, according to the various types of sensor information described in FIG. 1. If this idling stop permission decision is affirmative then the flow of control proceeds to a step S903, while if this decision is negative the flow of processing terminates. If in the step S902 the idling stop permission decision is affirmative, then fuel cut-off processing is executed in the step S903. After fuel cut-off, in a step S904 an idling stop timer TMISS is started, and then the flow of control proceeds to a step S905. TMISS$_{-1}$ means the value of this timer the previous time this processing was executed, so that the value for this timer is incremented each time this processing is performed at the fixed time interval. In the step S905 a decision is made as to whether or not the engine rotation is stopped, and if the engine rotation is not stopped then it is decided that the engine is still rotating after fuel cut-off due to inertia, while if the decision is negative then it is decided that the engine rotation is stopped state and this processing terminates. Next in a step S906, if the time elapsed upon the idling stop timer is greater than or equal to a predetermined value (for example 100 ms), then the flow of control proceeds to a step S907, in which supply of electrical power to the starter motor is commenced. After start of power supply to the starter motor, in a step S908 a starter motor power supply ON timer TMSTMR is started, and then the flow of control proceeds to a step S909. TMSTMR$_{-1}$ means the value of this timer the previous time this processing was executed, so that the value for this timer is incremented each time this processing is performed at the fixed time interval. In the step S909, if TMSTMR is greater than or equal to some predetermined time period (for example 150 ms), then it is determined that the starter pinion rotational speed has been sufficiently elevated, and the flow of control proceeds to a step S910, in which the supply of electrical power to the starter motor is turned OFF. If TMSTMR has not been running for the predetermined time period, then the supply of electrical power is continued.

In the step S910 the supply of electrical power to the starter motor is turned OFF, and, due to this starter motor power supply being turned OFF, the starter motor transits to its phase of inertial rotation; and then, after this turning of the starter motor power supply OFF in the step S910, the flow of control proceeds to a step S911, in which, if the crank timing at this time is the expansion stroke, the starter pinion is turned ON, so that the pinion gear is engaged with the ring gear.

Furthermore, while the method of deciding upon the expansion stroke in the step S911 according to the crank timing has been explained in the flow chart, it would also be acceptable to detect the engine rotational angular acceleration, and to decide upon the timing of the expansion stroke according to change of the angular acceleration direction (between positive and negative), although this concept is omitted from the flow chart explanation. It should be understood that here, by "change of the angular acceleration direction", is meant change according to the crank timing, as in the explanation above; in other words, it means the change of the angular acceleration that takes place due to the pressure of the combustion in the combustion chamber, that increases upon the compression stroke. At this timing, the reduction of the engine rotational speed temporarily becomes smaller, and the absolute value of the angular velocity changes to become smaller.

Since in this embodiment the rotating engine and the rotating starter pinion are engaged together while they are both rotating inertially, and the collision torque between the ring gear and the pinion is mitigated, accordingly it becomes possible for the engagement between the engine and the starter motor to be performed smoothly; and furthermore, along with the noise of collision during engagement and the noise of meshing being reduced, it is also possible to alleviate wear and tear upon the ring gear and the pinion. Moreover, since the starter pinion becomes engaged at the timing of the engine expansion stroke, the engine angular acceleration becomes smaller, and the reduction of the engine rotational speed decreases, accordingly the starter motor angular acceleration becomes closer to the engine angular acceleration, so that it is possible further to reduce the collision torque during engagement.

FIG. 10 is a flow chart showing a seventh embodiment of the present invention. This processing flow is executed at fixed time intervals (for example, every 10 ms).

In a step S1000, the ECU 3 reads in the engine rotational speed Ne that is calculated on the basis of crank angle sensor information, and then in a step S1001 it reads in the starter pinion rotational speed Np that is calculated based upon the starter pinion rotational sensor. Then in a step S1002 a decision is made as to whether or not to perform idling stop, according to the various types of sensor information described in FIG. 1. If this idling stop permission decision is affirmative the flow of control proceeds to a step S1003, while if it is negative this processing terminates. After the decision in the step S1002 that the idling stop permission is affirmative, the flow of control proceeds to a step S1003, in which fuel cut-off processing is performed. After fuel cut-off, in a step S1004 an idling stop timer TMISS is started, and then the flow of control proceeds to a step S1005. TMISS$_{-1}$ means the value of this timer the previous time this processing was executed, so that the value for this timer is incremented each time this processing is performed at the fixed time interval. In the step S1005 a decision is made as to whether or not the engine rotation is stopped, and if the engine rotation is not stopped then it is decided that the engine is still rotating after fuel cut-off due to inertia, while if the decision is negative then it is decided that the engine rotation is stopped state and this processing terminates. Next in a step S1006, if the time elapsed upon the idling stop timer is greater than or equal to a predetermined value (for example 100 ms), then the flow of control proceeds to a step S1007, in which supply of electrical power to the starter motor is commenced. After start of power supply to the starter motor, in a step S1008 a starter motor power supply time period TMSTMR is started, and then the flow of control proceeds to a step S1009. TMSTMR$_{-1}$ means the value of this timer the previous time this processing was executed, so that the value for this timer is incremented each time this processing is performed at the fixed time interval. In the step S1009, if TMSTMR is greater than or equal to some predetermined time period (for example 150 ms), then it is determined that the starter pinion rotational speed has been sufficiently elevated, and the flow of control proceeds to a step S1010, in which the supply of electrical power to the starter motor is turned OFF. If TMSTMR has not been running for the predetermined time period, then the supply of electrical power is continued.

In the step S1010 the supply of electrical power to the starter motor is turned OFF, and, due to this starter motor power supply being turned OFF, the starter motor transits to its phase of inertial rotation; and then in a step S1011 a starter motor power supply post-OFF timer TMSTMROF is started, and the flow of control proceeds to a step S1012. In this step S1012, if the interval timed by the timer TMSTMROF is greater than or equal to some predetermined time period (for example 150 ms), the starter pinion is turned ON, so that the pinion gear is engaged with the ring gear. In a step S1014, a decision is done if the engine rotation is stopped, and if the engine rotation is stopped then the flow of control proceeds to a step S1015, in which the starter pinion is turned OFF. But if the engine rotation is not stopped, then the starter pinion continues to be ON. Since in this embodiment the collision torque between the ring gear and the pinion is mitigated during pre-meshing, accordingly it becomes possible for the engagement between the engine and the starter motor to be performed smoothly; and furthermore, along with the noise of collision during engagement and the noise of meshing being reduced, it is also possible to alleviate wear and tear upon the ring gear and the pinion. Moreover, since it is possible to prevent the pinion returning before the engine rotation has stopped if a mechanical structure is provided for the pinion to return automatically when the engine rotational speed rises above a predetermined value, accordingly it is possible to engage the engine and the starter motor in a more reliable manner.

Next, an eighth embodiment of the present invention will be explained. Explanation of portions that are common with the other embodiments will be omitted. In this embodiment, the angular acceleration of the rotation of the engine and the angular acceleration of the rotation of the starter motor are adjusted by the ECU controlling the engine load and the supply of electricity to the starter motor, and it is possible to engage the engine and the starter motor together smoothly by bringing the rotational speeds of the engine and the starter motor closer and lower. It should be understood that the control of engine load during fuel cut-off may be implemented by adjusting the amount of intake air to the engine by controlling the throttle valve position. It would also be acceptable to arrange for the control of supply of electrical power to the starter motor not only to be timing control of the power supply timing, but also to be controlled to a desired angular acceleration by PWM control in which the ON/OFF changeover duty ratio is controlled, so that the level of rotational speed decrease can be adjusted. In this embodiment, in a similar manner to the case with the other embodiments, since the engagement is performed when the angular acceleration of the engine rotation and the angular acceleration of the starter motor rotation are the same or when the difference between them is small, accordingly the collision torque between the ring gear and the pinion is mitigated, and it becomes possible to perform engagement of the engine and the starter motor smoothly; and moreover, along with the noise of collision during engagement and the noise of meshing being reduced, it is also possible to alleviate wear and tear upon the ring gear and the pinion.

Next, a ninth embodiment of the present invention will be explained. Explanation of portions that are common with the other embodiments will be omitted. In this embodiment, the engagement between the engine and the starter motor is controlled by the ECU 3 so as to be performed when the rotational speed of the starter motor is greater than or equal to a predetermined value. This embodiment assumes that a starter motor is used that is not of the type that also serves as a generator, such as a motor-generator for a hybrid vehicle, and, if engagement with the engine is performed when the rotational speed of this type of starter motor is small and reverse rotation of the starter motor occurs due to the collision torque, then this may cause deterioration or failure of the starter motor. Thus, reverse rotation of the starter motor due to reverse rotation of the crankshaft is prevented by only performing engagement when the rotational speed of the starter motor is high enough for reverse rotation of the starter motor not to occur even though engagement with the engine is performed. Thus, in this embodiment, by preventing such reverse rotation of the starter motor, it is possible to suppress faults and deterioration of a starter motor that is not supposed to rotate in reverse, that is different from the case of a motor for a hybrid vehicle or the like.

The operation of the present invention will now be schematically explained with the aid of FIG. 11. (1) shows the normal vehicle running state; (2) shows the behavior of the vehicle when stopping upon actuation of the brake by the driver; after the vehicle has stopped, in (3) an idling stop decision is made if the state in which the brake is being stepped upon while the vehicle speed is 0 km/h continues; and in (4) idling stop permission is performed, fuel cut-off is performed, and the vehicle goes into its idling stop state. After this idling stop decision, in (5) electrical power is supplied to the motor relay for a predetermined time period. Then in (6) the rotation of the engine and the rotation of the pinion are both in the inertial rotation state. It should be understood that it would also be acceptable, when the brake pedal is hastily released due to the user changing his mind or the like, to provide supply of electrical power to the starter motor relay in consideration of the timing at which it is possible again to raise the engine rotational speed (i.e. to restart combustion) by fuel injection without using the starter motor. Moreover, if it is possible to forecast the rotational speed behavior during inertial rotation, then it would also be acceptable to provide supply of electrical power so as to control the degree of rotational speed effect, in consideration of the pre-mesh timing or the pre-mesh rotational speed. In (7), in the state with the engine rotation and the pinion both in the inertial rotation state, when some appropriate condition (for example, relating to the engine rotational speed, or to the difference between the engine rotational speed and the pinion rotational speed) is satisfied, the pinion is turned ON, and the engine ring gear and the pinion gear are engaged together.

(8) shows the state in which idling is stopped. In (9) idling stop is prohibited when the driver releases the brake, and electrical power is supplied to the starter motor relay and the pinion so that the engine is started. In (10), when it is determined that starting of the engine has been completed, both the starter motor and the pinion are turned OFF together. Here, it would also be acceptable to arrange to provide a mechanical construction so that the pinion is automatically turned OFF when the engine rotational speed rises. In (11) the vehicle returns to its normal state.

It should be understood that this explanation of the operation for idling stop is only given by way of example; the vehicle operational state for attaining idling stop is not to be considered as being limited thereby. Moreover, it would also be possible to apply the present invention to engine stopping and starting other than idling stopping, provided that the gist of the present invention is not departed from. For example, a beneficial effect in connection with suppression of collision torque and shortening of the time for engine restarting may also be expected when the ignition key is turned OFF and then is again turned ON.

According to the present invention, in a system in which, when a condition for engine idling stop to be permitted holds during operation of an automobile, fuel cut-off is performed and then pre-meshing is performed before the engine rotation stops, it is possible to improve the durability, wear resistance, and quietness of the starter system. Moreover, since it becomes possible to perform satisfactory pre-meshing, it is also possible to contribute to shortening of the time needed for restarting.

It should be understood that the ECU 3 operates as a vehicle control unit of the vehicle control device of the present invention that controls onboard devices, and also as the idling stop control unit of the idling stop system of the present invention.

The above described embodiments are examples, and various modifications can be made without departing from the scope of the invention.

What is claimed is:

1. A vehicle control device, comprising a vehicle control unit that controls engagement between an engine and a starter motor for starting the engine,
wherein the vehicle control unit causes the engine to rotate inertially with cutting off fuel supply to the engine, controls supply of electrical power to start rotation of the starter motor based on a rotational speed of the engine that is rotating inertially in a state in which fuel supply to the engine is cut off and the starter motor is not engaged with the engine, causes the starter motor to rotate inertially when a rotational speed of the starter motor has reached a first predetermined value, and engages the starter motor to the engine when the rotational speed of the engine and the rotational speed of the starter motor have become equal to each other or when an absolute value of difference of the rotational speed of the engine and the rotational speed of the starter motor has become less than or equal to a second predetermined value.

2. A vehicle control device according to claim 1, wherein the vehicle control unit causes the starter motor to be engaged with the engine when a direction of angular acceleration of the engine and a direction of angular acceleration of the starter motor are the same, or when a difference between a angular acceleration of the engine and an angular acceleration of the starter motor is less than or equal to a third predetermined value.

3. A vehicle control device according to claim 1, wherein the vehicle control unit controls timing of supply of electrical power to the starter motor according to an angular acceleration of the engine during inertial rotation.

4. A vehicle control device according to claim 1, wherein the vehicle control unit causes the starter motor and the engine to be engaged when rotational speed of the engine has become less than or equal to a predetermined value.

5. A vehicle control device according to claim 1, wherein the vehicle control unit causes the starter motor to be engaged with the engine when the engine rotating inertially is at its expansion stroke, or when the engine rotating inertially changes its angular velocity.

6. A vehicle control device according to claim 1, wherein the vehicle control unit causes continued engagement between the engine and the starter motor until the engine rotation stops.

7. A vehicle control device according to claim 1, wherein, when the engine is rotating inertially, the vehicle control unit controls a load of the engine by adjusting an amount of intake air, or controls the starter motor by controlling power supply timing or PWM duty ratio of an electrical power supply, so that an angular acceleration of the engine and an angular acceleration of the starter motor are the same, or their difference is within a predetermined range.

8. A vehicle control device according to claim 1, wherein the vehicle control unit causes the starter motor and the engine to be engaged when a rotational speed of the starter motor is greater than or equal to a fourth predetermined value.

9. A vehicle control device according to claim 1, wherein the vehicle control unit causes the starter motor to start rotation based on a rotational speed of the engine that has started inertial rotation and on a rate of rotational speed decrease.

10. A vehicle control device according to claim 1, wherein the first predetermined value is higher than either a pre-mesh rotational speed of the starter motor when the starter motor is engaged to the engine or a cranking rotational speed of the engine before beginning of rotational speed increase due to combustion after the engine is started by the starter motor.

11. A vehicle control device according to claim 1, wherein the vehicle control unit causes the starter motor and the engine to be engaged when a rotational speed of the starter motor is high enough for reverse rotation of the starter motor not to occur.

12. A vehicle control device according to claim 1, wherein the vehicle control unit controls a rotational speed of the engine while rotating inertially by adjusting the amount of intake air to the engine.

13. A vehicle control device according to claim 1, wherein the vehicle control unit controls power supply to the starter motor based on a timing when it is possible to restart combustion of the engine.

14. A vehicle control device according to claim 1, wherein the vehicle control unit causes the starter motor to be engaged with the engine when the engine is in the expansion stroke or when reduction of the engine rotational speed is temporarily smaller while the engine is rotating inertially.

15. An idling stop system, comprising an idling stop control unit that, along with pausing the operation of an engine when a predetermined condition for permitting engine pausing is valid, also controls engagement between the engine and a starter motor for restarting the engine,
wherein the idling stop control unit causes the engine to rotate inertially with cutting off fuel supply to the engine when the predetermined condition has become valid, controls supply of electrical power to start rotation of the starter motor based on a rotational speed of the engine that is rotating inertially, in a state in which fuel supply is cut off and the starter motor is not engaged with the engine, and to cause the starter motor to rotate inertially when a rotational speed of the starter motor has reached a first predetermined value, and engages the starter motor to the engine when the rotational speed of the engine and the rotational speed of the starter motor have become equal to each other or when an absolute value of difference of the rotational speed of the engine and the rotational speed of the starter motor has become less than or equal to a second predetermined value.

16. An idling stop system according to claim 15, wherein the idling stop control unit causes the starter motor to start rotation based on a rotational speed of the engine that has started inertial rotation and on a rate of rotational speed decrease.

17. An idling stop system according to claim 15, wherein the first predetermined value is higher than either a pre-mesh rotational speed of the starter motor when the starter motor is engaged to the engine or a cranking rotational speed of the engine before beginning rotational speed increase due to combustion after the engine is started by the starter motor.

18. An idling stop system according to claim 15, wherein the idling stop control unit causes the starter motor and the engine to be engaged when a rotational speed of the starter motor is high enough for reverse rotation of the starter motor not to occur.

19. An idling stop system according to claim 15, wherein the idling stop control unit controls a rotational speed of the engine while rotating inertially by adjusting the amount of intake air to the engine.

20. An idling stop system according to claim 15, wherein the idling stop control unit controls power supply to the starter motor based on a timing when it is possible to restart combustion of the engine.

21. An idling stop system according to claim 15, wherein the idling stop control unit causes the starter motor to be engaged with the engine when the engine is in the expansion stroke or when reduction of the engine rotational speed is temporarily smaller while the engine is rotating inertially.

* * * * *